United States Patent
Young

(10) Patent No.: US 8,843,961 B2
(45) Date of Patent: *Sep. 23, 2014

(54) MULTIPLE RESOLUTION AUDIO AND VIDEO SYSTEMS, METHODS OF PRODUCTION, DELIVERY AND USES THEREOF

(71) Applicant: Neil Young, Los Angeles, CA (US)

(72) Inventor: Neil Young, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/223,227

(22) Filed: Mar. 24, 2014

(65) Prior Publication Data
US 2014/0208353 A1    Jul. 24, 2014

Related U.S. Application Data

(63) Continuation of application No. 13/472,903, filed on May 16, 2012, now Pat. No. 8,719,864.

(60) Provisional application No. 61/488,108, filed on May 19, 2011.

(51) Int. Cl.
| | | |
|---|---|---|
| G06F 3/00 | (2006.01) | |
| G06F 13/00 | (2006.01) | |
| H04N 5/445 | (2011.01) | |
| H04N 21/439 | (2011.01) | |
| H04N 21/478 | (2011.01) | |
| H04N 21/472 | (2011.01) | |
| H04N 21/81 | (2011.01) | |

(52) U.S. Cl.
CPC ......... *H04N 21/8113* (2013.01); *H04N 21/439* (2013.01); *H04N 21/478* (2013.01); *H04N 21/47217* (2013.01); *H04N 21/8173* (2013.01)
USPC .............. 725/40; 725/145; 725/152; 348/555

(58) Field of Classification Search
None
See application file for complete search history.

(56) References Cited

U.S. PATENT DOCUMENTS 5,742,892 A * 4/1998 Chaddha ....................... 725/146

* cited by examiner

*Primary Examiner* — Jason J Chung
(74) *Attorney, Agent, or Firm* — Perkins Coie LLP

(57) ABSTRACT

A multiple-resolution audio and video system is disclosed that includes: at least one shared network infrastructure; at least one audio file, video file or a combination thereof, wherein each of the at least one audio file, video file or combination thereof has at least one resolution format and wherein one of the at least one resolution format is a studio quality resolution; at least one executable user interface application; and at least one device that accesses the at least one executable user interface application. Methods of using a multiple-resolution audio and video system include: providing at least one shared network infrastructure; providing at least one audio file, video file or a combination thereof, wherein each of the at least one audio file, video file or combination thereof has at least one resolution format and wherein one of the at least one resolution format is a studio quality resolution; providing at least one executable user interface application; and utilizing at least one device to access the at least one executable user interface application. Devices and related software applications are also contemplated herein.

7 Claims, 2 Drawing Sheets

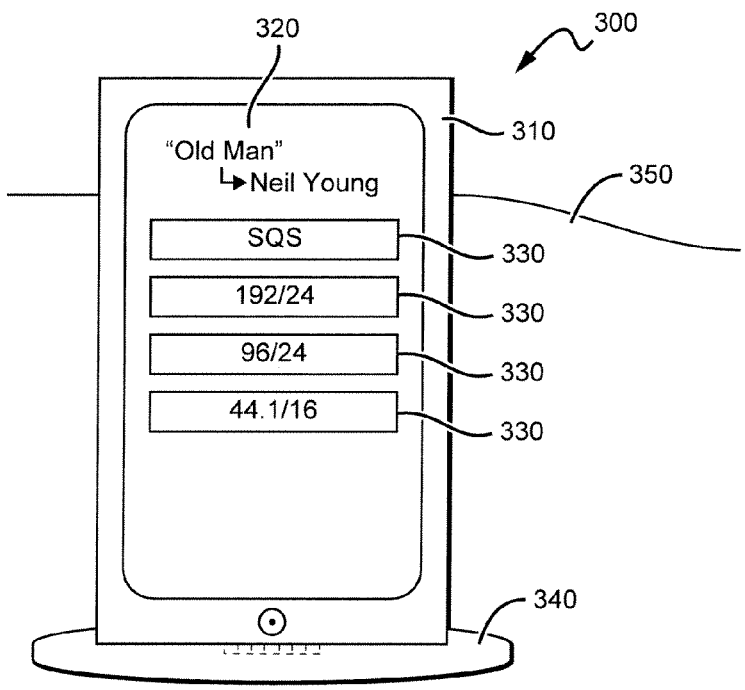
FIG. 3
FIG. 4
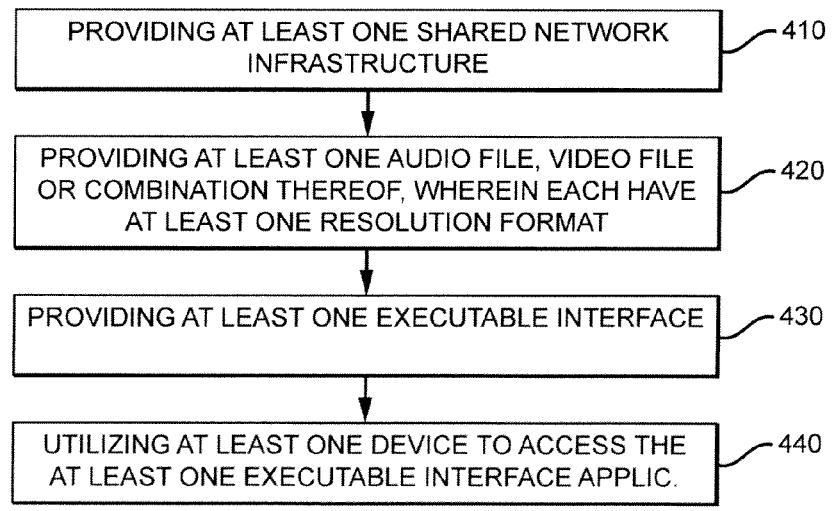

MULTIPLE RESOLUTION AUDIO AND VIDEO SYSTEMS, METHODS OF PRODUCTION, DELIVERY AND USES THEREOF

This United States Continuation Application claims priority to U.S. Utility application Ser. No. 13/472,903 filed on May 16, 2012 and claims priority to Provisional Application No. 61/488,108 filed on May 19, 2011 and entitled "High Resolution Music and Studio Quality Sound Platforms, Methods of Production, Delivery and Uses Thereof", and is related to both U.S. Utility application Ser. No. 12/483,881 and U.S. Utility application Ser. No. 12/690,801, all of which are commonly-owned and incorporated herein in their entirety by reference.

FIELD OF THE SUBJECT MATTER

The field of the subject matter is the ability to access multiple-resolution formats of audio and/or video files, including studio-quality sound and high resolution music, along with various platforms that store, access, provide and play that music, including related devices, methods of production and uses thereof.

BACKGROUND OF THE SUBJECT MATTER

Music and video consumers, especially those who utilize portable audio and video devices, have learned to settle with the quality of music and video content. In some instances, audio and video quality is sacrificed in order to keep file sizes small and easily storable/transferable. In other instances, the initial quality of recordings is poor to begin with resulting in a low quality reproduction or download. In yet other instances, the hardware and software of portable devices are not adequate to allow the full sound and video components to come across to the listener, as they were originally recorded by the studio or artist. In many instances, an audio or video file that begins as a high resolution file is "sampled down" or converted to a lower resolution when downloaded to a device that is unable to handle the original resolution.

Studio quality resolution and sound is generally that sound recorded in formats that are either the best available or desired by the artist. In either instance, the artist (or someone who represents the artist), the studio or the label certifies the file to indicate that it is "studio quality sound" or a "studio quality resolution file". In some instances, the artist or studio selects a resolution format that may not be the highest quality, but may be the best format for the sales platform (e.g. iTunes™ or Amazon™). High definition music and video should be recorded in the highest quality format available, regardless of the file size, and transmitted to users in that same quality format. Generally, music lovers purchase high end sound systems that can accommodate these large files, can reproduce the intricate sounds and phrasing that are never heard on lower end systems and portable players, but these same music lovers also want the ability to play music anywhere and on any device, many of which now don't support high resolution audio and/or video files, so they purchase devices that support lower resolution formats, including MP3 players.

Also, there are many systems that can accept high definition formats, but ultimately convert those files to a substandard format in order to transmit to the speakers and/or headphones and to deal with storage issues. For example, US 2008/0065768 discloses live streaming of high resolution video performances to a handheld device, but there is absolutely no disclosure regarding what happens to that performance once it reaches the handheld device. The disclosure focuses on the ability to view these performances from inside or outside of the venue, but there is no application that receives the high resolution video file and converts it so that it can be played in its original high resolution form on the handheld device with no loss of video or audio quality.

There is also a need to have systems that have the ability to access, store, accommodate and/or playback recorded studio or live music or video, live streaming music and/or video, archived studio or live music and/or video or a combination thereof in all available formats, including the original format intended by the artist ("studio quality resolution or sound"), high definition formats, such as blu-ray format, or any other desirable format. This flexibility means that the music can be heard, in its original format or at any other resolution without degradation of sound, on any sound system, including a laptop computer, a Cloud™ player, an iPod™ system, an MP3 or MP4 system, a desktop computer, a handheld device, such as a Palm Pilot, Blackberry or cell phone, and other suitable portable or local systems without being detrimentally converted into another form, compressed or otherwise modified.

Right now, artists tend to use different resolution formats in the studio for different reasons: a) some have been misled to believe that the human ear cannot hear any higher resolution than the one they have been presented with, although higher resolution is available; and b) some have chosen a lower resolution format over a higher resolution format or the highest resolution format in order to save money in storage and recording costs, thinking that their music can never be heard in the highest resolution anyway, because companies such as Apple™ release lower resolutions to their consumers. In other words, the artist believes it is a waste of money to record at a higher resolution format, if it will never be heard.

For older recordings, there are different issues. The resolution of recorded sound was very high when recordings were made in analog, before digital recording. Older recordings like vinyl have more detail in the sound. It is this factor—the detail—that allows one with experience over years in the art of sound recording to see the gradual migration of the art form of recorded sound degrade to a place where the generally accepted digital format (MP3) is only 5% of the highest digital format in large scale use (24/192). It is this degradation in the audio quality of retail consumer products that causes the artist to record in a lower resolution than is currently available. In other words, why record in high resolution if no one will ever hear it? It is desirable to be able to reverse this pattern of degradation in recorded sound quality.

Listeners should also be able to pick and choose the sound and/or video resolution format that they want to listen to and control every aspect of the listening experience whether it is at home, at the office, in a car or at the gym. Therefore, there is a need for a device or suite of devices that allows the listener to playback the highest possible resolution, based on resolution availability and device capability, while at the same time allowing the listener the flexibility of switching between available resolution formats for an audio file and/or video file.

It would be ideal to develop a multiple-resolution audio and video system that includes: at least one shared network infrastructure; at least one audio file, video file or a combination thereof, wherein each of the at least one audio file, video file or combination thereof has at least one resolution format and wherein one of the at least one resolution format is a studio quality resolution; at least one executable user interface application; and at least one device that accesses the at least one executable user interface application.

SUMMARY OF THE SUBJECT MATTER

A multiple-resolution audio and video system is disclosed that includes: at least one shared network infrastructure; at least one audio file, video file or a combination thereof, wherein each of the at least one audio file, video file or combination thereof has at least one resolution format and wherein one of the at least one resolution format is a studio quality resolution; at least one executable user interface application; and at least one device that accesses the at least one executable user interface application.

Methods of using a multiple-resolution audio and video system include: providing at least one shared network infrastructure; providing at least one audio file, video file or a combination thereof, wherein each of the at least one audio file, video file or combination thereof has at least one resolution format and wherein one of the at least one resolution format is a studio quality resolution; providing at least one executable user interface application; and utilizing at least one device to access the at least one executable user interface application.

Devices and related software applications are also contemplated herein. A contemplated executable user interface application that executes the studio-quality resolution, high-resolution, best resolution, acceptable resolution, selected resolution and/or high definition file in a device, comprises: identifying a studio-quality resolution, high-resolution, best resolution, acceptable resolution, selected resolution and/or high definition file, recognizing the at least one format of the file, optionally downloading or storing the file on a network or on the device, opening the file, providing a selectable menu listing the at least one format of the file that allows a user to select each of the at least one format of the file on the fly; and transmitting the content of the file to the user or listener through at least one speaker, at least one headphone, at least one earbud or another suitable listening device in order that the user may listen to the content of the file as it was originally recorded or transmitted.

BRIEF DESCRIPTION OF THE FIGURES

FIG. 3 shows a contemplated embodiment of the subject matter herein.

FIG. 4 shows a contemplated method.

DETAILED DESCRIPTION

An ideal and contemplated system is one that is designed for the typical music lover—the one who wants his or her music anywhere, anytime and in its originally produced and/or recorded form and who may not have the resources to invest in an extensive system to play high resolution and/or high definition audio and/or video. A contemplated system also includes devices and software applications that allow a listener to easily and quickly switch back and forth between the different available formats for an audio or video file as part of the software application. To this end, an executable application and a related interface system, along with the hardware and devices to support that application, have been developed and are described herein that allows high resolution or high definition music, video and audio files to be played as recorded without a loss of quality compression or detrimental conversion.

Providing the consumer with a device or player that can play back all of the resolutions in use today, while also informing the listener of the level of studio resolution quality of the product they have purchased as they are listening, will educate the consumer regarding different resolution formats. These resolution differences will readily be identified on the player and easily selected and heard by the user/consumer with a tool in the user interface on the device that allows the user to listen to the sound recording product in lower resolutions, switching back and forth among them in real time. This tool, "The Revealer" reveals the quality levels and exposes their differences simply by the user selecting lower quality levels on a touch-screen while listening. Other levels of quality which are higher than the product was recorded in will be greyed out and unavailable although viewable, revealing to the consumer the limitations of the recording they have purchased. However the consumer will possibly have heard these higher levels of quality on another recording(s) they have purchased and played on the player while using the Revealer and be familiar with them, which will cause the artists to improve the quality level of the studio resolutions they use. Artists will enter the marketplace with an inferior product to their competitors if they don't. And that will begin to restore quality to the art of recorded sound for the masses and will also be a step toward bringing back all of the enjoyment that can be derived and felt from listening to completely recorded music at high resolution. The experience is similar to listening to vinyl.

Figure 2:
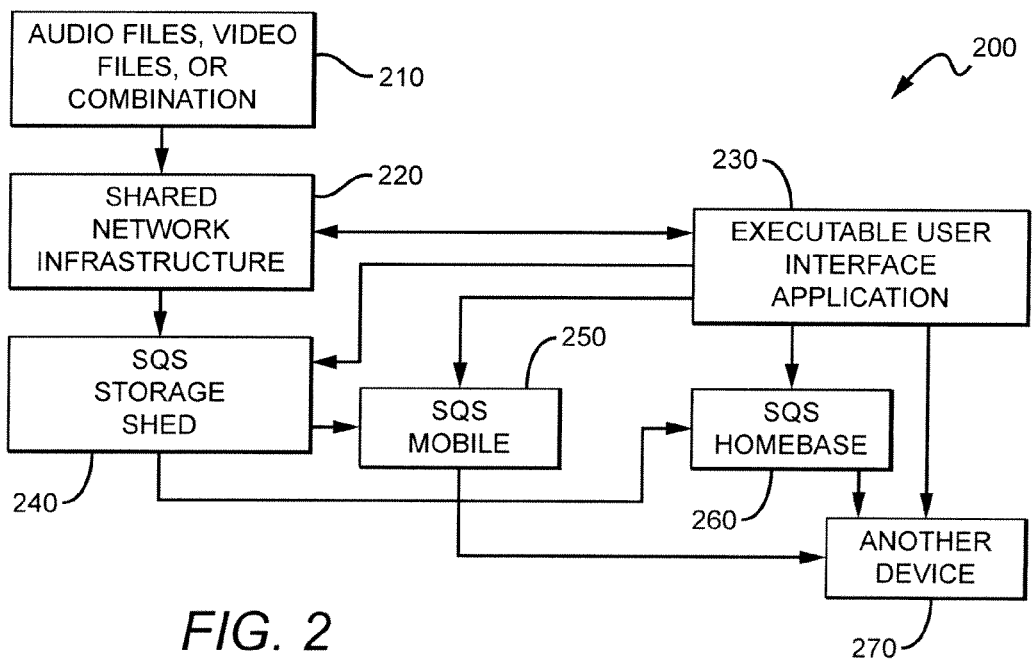
FIG. 2 shows a contemplated embodiment of the subject matter herein.

Specifically and as shown in FIG. 2, a multiple-resolution audio and video system is disclosed that includes: at least one shared network infrastructure 220; at least one audio file, video file or a combination thereof 210, wherein each of the at least one audio file, video file or combination thereof has at least one resolution format and wherein one of the at least one resolution format is a studio quality resolution (not shown); at least one executable user interface application 230; and at least one device 240, 250, 260 and/or 270 that accesses the at least one executable user interface application.

Methods of using a multiple-resolution audio and video system 400 are shown in FIG. 4 and include: providing at least one shared network infrastructure 410; providing at least one audio file, video file or a combination thereof, wherein each of the at least one audio file, video file or combination thereof has at least one resolution format and wherein one of the at least one resolution format is a studio quality resolution 420; providing at least one executable user interface application 430; and utilizing at least one device to access the at least one executable user interface application 440.

Devices and related software applications are also contemplated herein. A contemplated executable user interface application that executes the studio-quality resolution, high-resolution, best resolution, acceptable resolution, selected resolution and/or high definition file in a device, comprises: identifying a studio-quality resolution, high-resolution, best resolution, acceptable resolution, selected resolution and/or high definition file, recognizing the at least one format of the file, optionally downloading or storing the file on a network or on the device, opening the file, providing a selectable menu listing the at least one format of the file that allows a user to select each of the at least one format of the file on the fly; and transmitting the content of the file to the user or listener through at least one speaker, at least one headphone, at least one earbud or another suitable listening device in order that the user may listen to the content of the file as it was originally recorded or transmitted.

As contemplated herein, at least part of the contemplated methods and systems utilize, access and/or store information on at least one shared network infrastructure. Contemplated shared network infrastructures include the Internet or a web service, the Cloud, a network structure, a grid-computing system, a mainframe computer system, a utility computing system, a peer-to-peer architecture system or a combination thereof.

A studio quality sound and/or high-resolution music application comprises: a) a studio quality resolution format file, a high resolution audio file or a combination thereof, b) an executable application that is compatible with the studio quality resolution format file, a high resolution audio file or a combination thereof, and c) a device that contains both the studio quality resolution format file, a high resolution audio file or a combination thereof and the executable application, wherein the device comprises at least one speaker, at least one control system, at least one headphone or earbud port or a combination thereof.

Also, a studio quality resolution multi-media application comprises: a) at least one studio quality resolution format file, a high resolution audio file or a combination thereof, b) an executable application that is compatible with the at least one studio quality resolution format file, a high resolution audio file or a combination thereof, and c) a device that contains both the at least one studio quality resolution format file, a high resolution audio file or a combination thereof and the executable application.

In these applications, the at least one studio quality resolution format file, a high resolution audio file or a combination thereof comprises an audio file, a video file, a multi-media file or a combination thereof, wherein the device comprises at least one speaker, at least one control system, at least one headphone or earbud port or a combination thereof.

Figure 1:
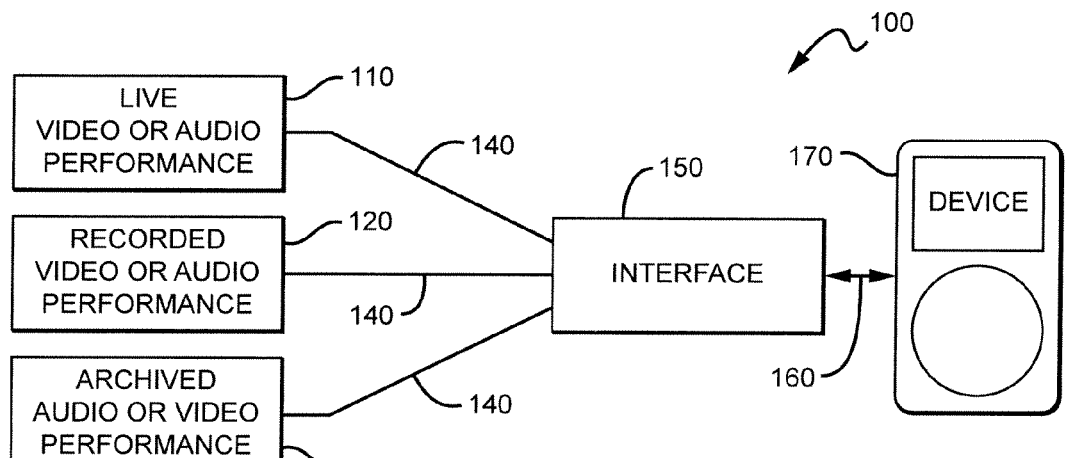
FIG. 1 shows a contemplated embodiment of the subject matter herein.

FIG. 1 shows a schematic of a contemplated embodiment of a studio-quality resolution format file, high-resolution format file, a lower resolution file, or a high definition multi-media application and system 100. In this embodiment, a studio-quality resolution format file, high-resolution format file, a lower resolution file (110, 120, 130) is forwarded to, loaded on to or downloaded on to 140 a suitable interface or interface system 150. A user (not shown) can utilize a suitable device 170 to access 160 the interface system 150 in order to identify the format of the file (110, 120, 130), download or transmit the file to the device 170 without compression or detrimental conversion.

As used herein, the phrase "compatible with" used with respect to phrases herein, such as "an executable application that is compatible with the studio-quality resolution format or high resolution format audio file" or "an executable application that is compatible with the at least one high resolution file", means that the application can recognize the format of the at least one studio-quality resolution format file, the at least one high resolution file, or another contemplated resolution file type regardless of its format and can transmit it or convert it, if needed, to be transmitted by the device or hardware. As will be mentioned later in the application, high resolution or high definition formats come in many forms, so contemplated applications will be able to recognize those formats and ensure that the file is suitable for transmission by the device in its original high definition or high resolution form without compression or detrimental conversion procedures.

It should be understood that "studio-quality resolution" or "studio-quality sound" means that quality/resolution that the audio file, video file or combination thereof is originally recorded or captured in. In other words, depending on the decade that the sound was recorded, the studio-quality resolution could be in any suitable format for that time or location. It is contemplated that a "studio-quality resolution file" or "studio-quality sound file" will be certified by an industry accepted certification process or by the artist (or artist's management, estate or representative), such that the listener understands that the file labeled "studio-quality resolution" is the best resolution of that file available and is in the format intended by the artist at the original recording session whether that be in studio or live. In some embodiments, an additional/optional feature would be a local executable application that automatically checks new downloaded materials (audio files, video files) to confirm that they are SOS certified. In other embodiments, it is contemplated that a "studio-quality sound file" will be certified by the artist (or artist's management, estate or representative) and certified during the SOS process when the file is loaded into the cloud or the at least one shared network infrastructure for distribution to consumers, such that the listener understands that the file labeled "studio-quality sound" is the best resolution of that file available and is in the format intended by the artist at the original recording session whether that be in studio as a mix, a copy of a legacy analog mix, or live.

Some contemplated embodiments include methods of producing and operating a studio-quality resolution file or a high-resolution music file application as a group with at least one lower resolution file, wherein these methods comprise: a) providing a studio-quality resolution file or a high-resolution music file, along with at least one lower resolution file, b) providing an executable application that is compatible with the studio-quality resolution file or a high-resolution music file, along with at least one lower resolution file, and c) providing a hardware device that contains both the studio-quality resolution file or a high-resolution music file, along with at least one lower resolution file, and the executable application, wherein the executable application identifies the format, transmits the file, stores the file or a combination thereof the studio-quality resolution file or a high-resolution music file, along with at least one lower resolution file, and wherein the device comprises at least one speaker, at least one control system, at least one headphone or earbud port or a combination thereof.

Also, contemplated methods of producing and operating a studio-quality resolution file or a high-resolution music file application comprises: a) providing at least one studio-quality resolution file or a high-resolution music file, b) providing an executable application that is compatible with the at least one studio-quality resolution file or a high-resolution music file, and c) providing a device that contains both the at least one studio-quality resolution file or a high-resolution music file and the executable application, wherein the executable application identifies the format, transmits the file, stores the file or a combination thereof the studio-quality resolution file or a high-resolution music file and wherein the device comprises at least one speaker, at least one control system, at least one headphone or earbud port or a combination thereof.

Contemplated studio-quality resolution, high-resolution and/or high definition audio and/or video systems would be able to accommodate recorded studio or live music or video, live streaming music and/or video, archived studio or live music and/or video or a combination thereof in high definition formats, such as blu-ray format. This flexibility means that the music can be heard, in its original format, on any sound system, hardware system or portable device, including a laptop computer, a Cloud™ player, an iPod™ system, an MP3 or MP4 system, a desktop computer, a handheld device, such as a Palm Pilot, Blackberry, Android, or cell phone, and/or other suitable portable or local systems without being detrimentally converted into another form, compressed or otherwise modified.

Additional systems can be designed for use in land, water and air transportation, such that the device is designed as part of the design of the vehicle or the device is designed to be readily incorporated into the transportation components, such as coupling with the cigarette lighter/power supply or another coupling port on the vehicle. Part of this flexibility, specifically, is that the user never has to provide any information to the device with respect to format. The device immediately recognizes the format, accepts the file size, and can open, play and save that file in its original and intended format. And in other embodiments, if the audio file or video file has several available formats, the listener or software application user is presented with a menu of all of the available formats. The user can select each format and hear or view that file with that format. The user can then switch back and forth between formats on the fly without starting the audio and/or video file over again from the beginning. The new selected format picks up in the audio or video file where the last selected format stopped.

Additionally, contemplated studio-quality resolution, high-resolution, best resolution, acceptable resolution, selected resolution and/or high definition applications and devices comprise the ability to transmit the sound from the file to the headphones or speakers of the device or combination of devices. In these embodiments, the device or devices will allow for instant studio-quality resolution, high-resolution, best resolution, acceptable resolution, selected resolution and/or high definition playback through the headphones or speakers automatically. In many instances, some contemplated devices will convert the signal from digital to analog in order to play through the headphones.

In some embodiments, contemplated software applications and/or device interfaces can be split into two or more windows in order to show the information being stored on the at least one shared network infrastructure and what is being stored on the local storage device or system. In addition, a window may be open that allows the listener to interact with social media applications, such as those described and claimed in U.S. application Ser. No. 13/396,240 entitled "Social Media Communication Network and Methods of Use", which is commonly owned and incorporated herein in its entirety by reference.

In addition to the contemplated system described above, users may also want the ability to edit video and music files within the file, such that songs, musical segments/sets and/or videos can be extracted from live performances or recorded segments and edited within the song. Contemplated devices and software applications may allow for that ability to edit the audio and/or video files.

In order to achieve these ideal results, an application should be developed that can allow a user edit audio/video files within the file, allow instant format recognition by the device, and allows the user to hear the studio-quality resolution, high-resolution, best resolution, acceptable resolution, selected resolution and/or high definition sound through speakers and/or headphones. This application or "app. file" can be loaded onto, downloaded onto or provided initially with any suitable device, such as those mentioned earlier. In some embodiments, the executable user interface application executes the studio-quality resolution, high-resolution, best resolution, acceptable resolution, selected resolution and/or high definition file in the device by a) identifying a studio-quality resolution, high-resolution, best resolution, acceptable resolution, selected resolution and/or high definition file, b) recognizing the format of the file, c) optionally downloading or storing the file on a network or on the device, d) opening the file, and e) transmitting the content of the file to the user or listener through at least one speaker, at least one headphone, at least one earbud or another suitable listening device in order that the user may listen to the content of the file as it was originally recorded or transmitted. In other embodiments, the term "executes" comprises playing the content of the studio-quality resolution, high-resolution, best resolution, acceptable resolution, selected resolution and/or high definition on the device for the user and/or listener to hear, as it was originally recorded and/or transmitted.

Also, devices that are able to run these contemplated applications or app. files are contemplated herein, especially those devices that have wireless capability and allow immediate transmissions of live events to be played on the device, as the event is happening.

It is contemplated that the user will be able to view playlists and content directly on a portable device or through the use of an interface system, such as a network, iTunes, Yahoo Music or another suitable Internet-based interface system. The user can utilize this interlace system, which is connected in some way to a server, server farm or network, to subscribe to and download other music/videos. Content may also be purchased or downloaded through other sites and included on a contemplated device. For example, high definition compilations, such as the Neil Young compilation/archive project, may be downloaded into these devices and played back using studio-quality resolution, high-resolution, best resolution, acceptable resolution, selected resolution and/or high definition audio and video.

EXAMPLES

Example 1

Live Plus Download Updates from Artists

A contemplated user may subscribe to all live events available from Neil Young as they become available. During the recording of Neil Young's new album, he sets up cameras and additional sound transmission/recording devices in the recording studio that will allow live sessions of the recording to be streamed in real-time to subscribers in high definition and/or high resolution formats. If the user subscribes to "live feed only"—then the transmission is not downloaded or otherwise saved on the user's device/player in high definition and/or high-resolution format that is not and does not need to be compressed. If the user subscribes to "live feed plus download", then the transmission is downloaded—in the original format—to the user's device or device interface either during or after the live feed is transmitted. If the user enjoys a certain segment of the recording, the user can edit the file to remove other portions of the recording and save the modified recording in its original high definition and/or high-resolution uncompressed format. Unlike other conventional devices, the user can edit recordings on the portable device directly, along with editing the recordings on a desktop (non-portable) or computer-based device.

The user can also download the live event in various playback forms, including digital video, digital audio, high resolution video and/or audio, low resolution video and/or audio or all of the above. The various playback forms can be displayed on one storage and/or playback unit, so that the user can switch back and forth between the various forms, depending on the needs of the user at the time.

Example 2

Music Service Cloud

The Cloud (and contemplated storage and interactive global storage systems or shared Internet infrastructure) provides an opportunity for high resolution and high quality music to be stored and accessed. Listeners who are dissatisfied with the quality of MP3 or AAC files potentially could have the choice of quality listening. Contemplated herein is a Cloud system that allows artists and producers to store, catalog and make accessible music and video that has the same quality as original recordings.

Example 3

SQS, "Studio Quality Sound" or Studio-Quality Resolution—the Sound Heard by the Artists and Producers Who Created the Original Recordings As mentioned earlier, "studio-quality resolution" or "studio-quality sound" means that quality/resolution that the audio file, video file or combination thereof is originally recorded or captured in. In other words, depending on the decade that the sound was recorded, the studio-quality resolution could be in any suitable format for that time or location. It is contemplated that a "studio-quality resolution file" or "studio-quality sound" will be certified by an industry accepted certification process or by the artist (or artist's management, estate or representative), such that the listener understands that the file labeled "studio-quality resolution" is the best resolution of that file available and is in the format intended by the artist at the original recording session whether that be in studio or live. In some embodiments, an additional/optional feature would be a local executable application that automatically checks new downloaded materials (audio files, video files) to confirm that they are SQS certified. In other embodiments, it is contemplated that a "studio-quality sound file" will be certified by the artist (or artist's management, estate or representative) and certified during the SQS process when the file is loaded into the cloud or the at least one shared network infrastructure for distribution to consumers, such that the listener understands that the file labeled "studio-quality sound" is the best resolution of that file available and is in the format intended by the artist at the original recording session whether that be in studio as a mix, a copy of a legacy analog mix, or live.

To put this in practical terms, SQS quality or resolution levels vary with the original recordings. Studios and artists have several conventional levels of resolutions available to record original audio files and/or video files in including: 16/44.1, 20/44.1, 24/44.1, 20/48, 24/48, 20/88.2, 24/88.2, 20/96, 24/96, 20/176.4, 24/176.4, 20/192, 24/192. As additional resolution levels are developed, those new levels are intended to be included in this disclosure. Those master recordings are not all the same quality. SQS can be as low as 44.1/16 CD, or as high as 192/24 Blu ray, depending on the year they were created and the choices of the artist/producer. Currently, there is an intermediate 96/24 DVD format, which is the compromise reached by some artists and producers. As contemplated herein, all versions of SQS will be available from the Music Service Cloud, but will not be labeled as "SQS" unless they are truly the Studio Quality Sound heard by the artists and producers who created original recordings.

In contemplated embodiments, a user or listener does not have to buy space to store SQS files, but instead can let the service—"Music Service Cloud"—store them for me. All that is needed is a key or customer portal to access purchased and/or downloaded selections from the cloud. If the listener wants to store the songs and/or videos locally, content can be downloaded into the listener's "Storage Shed".

Example 4

PureTone Sound Sculpture

This contemplated resolution format is the sound that was created by the artist in the studio when the original music was recorded and mixed. It is presented flat, unequalized and uncompressed. A contemplated embodiment of this format reproduces that original studio sound. PureTone Sound was designed so that the playback of PureTone files makes them sound really huge (give the sound more depth) even on the small speakers users associate with their MP3 players. The key characteristic of PureTone Sound is that there is a complete absence of programming of the sound and/or sound file.

Example 5

Local Storage System

SQS Local Storage Systems or an "Earth Storage Shed" is designed to store and play back SQS with crystal clarity, just like the artists and producers heard when the mix was created.

SOS local storage systems that are contemplated herein are designed to access and store files locally. These files are free to be emptied out and refilled with new music. All of the audio files, video files or combinations thereof are stored on the Cloud Music Service, and therefore, the local storage system contemplated herein is analogized to a playlist—a list that contains at least part of the audio files, video files or combinations thereof that are stored on the Cloud Service or shared network or internet infrastructure. The user or listener can decide what he or she wants to leave in the Cloud for now and what he or she wants in my shed. The Cloud currently cannot play back SQS files directly, because SQS files have more density than conventionally available streams and streaming services can handle.

As contemplated herein, at least one executable interface application can be utilized to open a Music Service Cloud (or other shared network or internet infrastructure storage system and download any purchased SQS song into the local storage system and/or device. There it sits, and this large or "massive" SQS file is ready to play at an instant's notice with no dropouts, even though it is a relatively large Studio Quality Sound resolution file.

Example 6

SQS Mobile or "the Revealer"

A contemplated SQS resolution audio file can be played on any suitable device, as outlined earlier. These contemplated devices may also be "SOS Certified", in that they are authenticated to be able to accurately reproduce the SQS sound and/or video files as they were intended. In other embodiments, a portable mobile storage system can be located in a vehicle, such as a car, an office, an airplane, a boat, a recreational vehicle or any other mobile location outside of a home. A tablet, smart phone or other device can be "docked" to the portable mobile storage system in order to listen to the audio files, video files or combination thereof.

Another feature that is especially useful in the mobile setting is the use of at least one executable interface application 300 that is shown in FIG. 3. In this Figure, a tablet device 310 is shown docked on a docking station 340 on the inside of a car 350. The at least one executable interface application has been executed and a song has been selected—"Old Man" by Neil Young 320. The audio file is available in 4 different formats 330 and those formats are shown for selection. For example:

24/192 Bluray highest resolution available (similar to vinyl)
24/96 DVD half of highest resolution available
16/44.1 CD 15% of highest resolution available
MP3 I-tunes 5% of highest resolution available The user touches or selects the desired format and that format is played by accessing that format file from the storage device. A user can jump back and forth between formats with missing a beat. It should be understood that the storage device in this Example is the local storage device, but it could be any suitable and connected storage device.

As mentioned, suitable at least one executable user interface applications are stored on any suitable network or local system. In some contemplated embodiments, at least one executable user interface applications are stored or located on a portable media storage device, a hand held device, a tablet computer, a laptop computer, a desk top computer, a network server, an internet server, the cloud or a combination thereof.

Example 7

SQS Homebase or "Ivanhoe"

Ivanhoe is a hardware system that comprises all of the components disclosed herein, including at least one storage system, at least one audio file, video file or a combination thereof, wherein each of the at least one audio file, video file or combination thereof has at least one resolution format and wherein one of the at least one resolution format is a studio quality resolution; at least one executable user interface application; and at least one device that accesses the at least one executable user interface application. It is a storage system with a high quality codec and analog only outputs. It stores files in cars, homes and commercial environments. Currently, files for phones and mobile devices will need to be stored on the Cloud or another shared network infrastructure, but that current reality to change as technology advances. In some embodiments, the accessibility is controlled by a user interface application on a portable device. However, there may be some contemplated embodiments where a local interface is provided with the hardware system.

Example 8

Specifications for a Contemplated Embodiment

Memory should be about a terabyte, but it could be any suitable size. Depending on cost this could be reduced in size but start with 1 terabyte. That would allow over 3 thousand songs. Virtual album covers would reduce the number of songs. Capability for grouping of devices is desired.
Internet Connection
DAC. Able to playback multiple formats with high quality, including HDCD DAC. Ideally the DAC should be able to play all formats from mp3 to 24/192.
Contemplated Formats:
Mp3: 128 and 256
MP3/CD/96/192
MP3/CD/88/176
44.1/88.2/176.4
48/96/192
16/20/24 bit rates
Audio Outputs:
6 analog audio outputs
1 Digital video-only out that should be able to play highest resolution.
Player should play analog sound in sync with digital picture. Sync offset desired for perfect sync with some screens.
Audio Specifications: In some embodiments, Dolby Digital, DTS, and Uncompressed PCM will be required for players. However, the following formats are optional—Dolby Digital Plus, Dolby TrueHD, DTS-HD.
Blue Tooth Control of the player can be an executable application on a portable device or computer.

Thus, specific embodiments and applications of high definition music and studio quality sound platforms, methods of production, delivery and uses thereof have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. An executable user interface application that executes the studio-quality resolution, high-resolution, best resolution, acceptable resolution, selected resolution and/or high definition file in a device, comprises:
   identifying a studio-quality resolution, high-resolution, best resolution, acceptable resolution, selected resolution and/or high definition file,
   recognizing at least one format of the file,
   optionally downloading or storing the file on a network or on the device,
      wherein the network comprises a shared network infrastructure;
      wherein the shared network infrastructure comprises the internet or a cloud network;
      wherein the at least one format of the file comprises at least two different resolution formats; and
      wherein the at least two different resolution formats further comprises:
   PureTone resolution format, 44.1/16 resolution format, 192/24 resolution format, or 96/24 resolution format;
   opening the file;
   providing a selectable menu listing the at least one format of the file that allows a user to select each of the at least one format of the file on the fly; and
   transmitting the content of the file to the user or listener through at least one speaker, at least one headphone, at least one earbud or another suitable listening device in order that the user may listen to the content of the file as it was originally recorded or transmitted.

2. The interface application of claim 1, wherein the executable user interface application is a software application.

3. A device that comprises the executable user interface application of claim 1, wherein the executable user interface application is stored on the device.

4. The device of claim 3, wherein the device comprises a sound system, a laptop computer, a Cloud player, an MP3 or MP4 system, a desktop computer, a handheld device, a tablet device, an iPad, a Google glasses system, a cell phone, a smart phone or a combination thereof.

5. A non-transitory, computer-readable medium, which when executed on a data processing device, performs a method, the method comprising:
    identifying a studio-quality resolution, high-resolution, best resolution, acceptable resolution, selected resolution and/or high definition file,
    recognizing at least one format of the file,
    optionally downloading or storing the file on a network or on the device,
        wherein the network comprises a shared network infrastructure;
        wherein the shared network infrastructure comprises the internet or a cloud network;
        wherein the at least one format of the file comprises at least two different resolution formats; and
        wherein the at least two different resolution formats further comprises:
    PureTone resolution format, 44.1/16 resolution format, 192/24 resolution format, or 96/24 resolution format;
    opening the file;
    providing a selectable menu listing the at least one format of the file that allows a user to select each of the at least one format of the file on the fly; and
    transmitting the content of the file to the user or listener through at least one speaker, at least one headphone, at least one earbud or another suitable listening device in order that the user may listen to the content of the file.

6. The non-transitory, computer-readable medium of claim 5, wherein the method comprises a software application.

7. A system, comprising:
at least one processor and memory,
means for identifying a studio-quality resolution, high-resolution, best resolution, acceptable resolution, selected resolution and/or high definition file,
means for recognizing at least one format of the file,
means for optionally downloading or storing the file on a network or on the device,
    wherein the network comprises a shared network infrastructure;
    wherein the shared network infrastructure comprises the internet or a cloud network;
    wherein the at least one format of the file comprises at least two different resolution formats; and
    wherein the at least two different resolution formats further comprises:
PureTone resolution format, 44.1/16 resolution format, 192/24 resolution format, or 96/24 resolution format;
means for opening the file;
means for providing a selectable menu listing the at least one format of the file that allows a user to select each of the at least one format of the file on the fly; and
means for transmitting the content of the file to the user or listener through at least one speaker, at least one headphone, at least one earbud or another suitable listening device in order that the user may listen to the content of the file.

* * * * *

UNITED STATES PATENT AND TRADEMARK OFFICE
CERTIFICATE OF CORRECTION

PATENT NO. : 8,843,961 B2  
APPLICATION NO. : 14/223227  
DATED : September 23, 2014  
INVENTOR(S) : Neil Young Page 1 of 1

It is certified that error appears in the above-identified patent and that said Letters Patent is hereby corrected as shown below:

Title Page, Item (54) and in the Specification, in column 1, line 1, Delete "MULTIPLE RESOLUTION" and insert -- MULTIPLE-RESOLUTION --, therefor.

In the Specification

In column 6, line 8, delete "SOS" and insert -- SQS --, therefor.

In column 6, line 12, delete "SOS" and insert -- SQS --, therefor.

In column 8, line 16, delete "interlace" and insert -- interface --, therefor.

In column 11, line 52, delete "terabyte." and insert -- terrabyte. --, therefor.

Signed and Sealed this  
Third Day of February, 2015

Michelle K. Lee  
*Deputy Director of the United States Patent and Trademark Office*